United States Patent
Kakuta

(10) Patent No.: US 8,014,089 B2
(45) Date of Patent: Sep. 6, 2011

(54) LENS DRIVING UNIT AND LENS DRIVING DEVICE

(75) Inventor: Yoshio Kakuta, Saitama (JP)

(73) Assignee: Tamron Co., Ltd., Saitama-shi, Saitama (JP)

( * ) Notice: Subject to any disclaimer, the term of this patent is extended or adjusted under 35 U.S.C. 154(b) by 104 days.

(21) Appl. No.: 12/409,086

(22) Filed: Mar. 23, 2009

(65) Prior Publication Data

US 2009/0244732 A1    Oct. 1, 2009

(30) Foreign Application Priority Data

Mar. 21, 2008    (JP) .................................. 2008-073447

(51) Int. Cl.
*G02B 7/02*    (2006.01)

(52) U.S. Cl. ........................................ 359/823

(58) Field of Classification Search ................ 359/824, 359/821–823, 694–696
See application file for complete search history.

(56) References Cited

U.S. PATENT DOCUMENTS

| | | | |
|---|---|---|---|
| 4,980,711 A * | 12/1990 | Komatsuzaki et al. | 396/79 |
| 5,745,803 A * | 4/1998 | Ito | 396/83 |
| 2007/0195292 A1 * | 8/2007 | Shindo et al. | 353/101 |
| 2008/0085112 A1 * | 4/2008 | Lane et al. | 396/349 |

FOREIGN PATENT DOCUMENTS

| | | |
|---|---|---|
| JP | 8271777 A | 10/1996 |
| JP | 8292358 A | 11/1996 |
| JP | 2002131611 A | 5/2002 |
| JP | 2005017782 A | 1/2005 |
| JP | 2006064838 A | 3/2006 |
| JP | 2006154373 A | 6/2006 |
| JP | 2007140396 A | 6/2007 |

* cited by examiner

*Primary Examiner* — Ricky Mack
*Assistant Examiner* — Vipin Patel
(74) *Attorney, Agent, or Firm* — Rothwell, Figg, Ernst & Manbeck, P.C.

(57) ABSTRACT

Object of the present invention is to provide a lens driving unit in small size and perform a high ratio optical zooming and a lens driving device. To achieve the object, the lens driving unit in which the lens group holding frame supported to be able to slide by connecting to a guide pole arranged in parallel with the optical axis; and a drive transmission unit consisting of a pinion mounted on the output shaft of the motor and a rack formed in the lens group holding frame is adopted, and a driving force of the motor is transmitted to the lens group holding frame by gearing the pinion with the rack to make the lens group holding frame slide along the guide pole, and a lens driving device comprising the lens driving unit is adopted.

11 Claims, 9 Drawing Sheets

LENS DRIVING UNIT AND LENS DRIVING DEVICE

BACKGROUND OF THE INVENTION

1. Field of the Invention

The present invention relates to a lens driving unit for sliding a lens group holding frame used in an imaging device, and a lens driving device for independently driving two lens groups.

2. Description of the Related Art

For a optical zooming system of an imaging device, a system in which two lens groups (a zooming lens group and a focusing lens group) are provided, and the system in which these lens groups are made to move in the optical axis direction has been applied. These two lens groups held in holding frames for holding the lens groups respectively are arranged in series so as to be able to slide in the optical axis direction.

To reduce size and weight of imaging device, for a lens driving device provided in a lens tube as well, a technology for reducing the size has been required. For example, in any of Japanese Patent Laid-Open No. 2005-17782, Japanese Patent Laid-Open No. 8-292358, Japanese Patent Laid-Open No. 2006-154373, Japanese Patent Laid-Open No. 8-271777, Japanese Patent Laid-Open No. 2006-64838, Japanese Patent Laid-Open No. 2002-131611 and Japanese Patent Laid-Open No. 2007-140396, size reduction in the width direction of the lens tube is achieved by gathering two driving mechanism parts (motor, lead screw) for driving two lens groups together on one side of the outside boundary of lens.

Japanese Patent Laid-Open No. 2005-17782
Japanese Patent Laid-Open No. 8-292358
Japanese Patent Laid-Open No. 2006-154373
Japanese Patent Laid-Open No. 8-271777
Japanese Patent Laid-Open No. 2006-64838
Japanese Patent Laid-Open No. 2002-131611
Japanese Patent Laid-Open No. 2007-140396

In recent years, for a high-performance lens having higher zooming ratio, size reduction has been required as well. However, to achieve a higher optical zooming ratio, the moving distances of a focusing lens and a zooming lens should be made long in general. Therefore, in reducing the size and weight of a lens having a high zooming ratio, the length in the optical axis direction of the lens driving device is physically restricted.

For example, in the technologies disclosed in Japanese Patent Laid-Open No. 2005-17782, Japanese Patent Laid-Open No. 8-292358 and Japanese Patent Laid-Open No. 2006-154373, a lead screw is provided in the driving mechanism part directly driven by a motor, and the motors and the lead screws are opposed to each other in parallel and coaxially with the optical axis, and it makes the total length in the optical axis direction long.

In the technology disclosed in Japanese Patent Laid-Open No. 8-271777, the motor and the lead screw are connected to each other by a transmission mechanism using a plurality of members, and it makes arrangement of the transmission mechanism difficult. Also, since the number of parts increases, it makes reduction of the size and weight difficult.

Also, in Japanese Patent Laid-Open No. 2006-64838 and Japanese Patent Laid-Open No. 2002-131611, driving force generation parts for driving two lens holders are arranged in parallel, and a motor, a drive shaft, and driving force transmission part (screw shaft, screw rod, etc.) are arranged coaxially. Therefore, the members are arranged in series in the optical axis direction, it is hard to make the length in the optical axis direction short.

That is to say, for the lens driving device in the conventional art, although the size in the width direction of the lens tube can be reduced, it has been difficult to reduce the size in the optical axis direction in the high ratio optical zooming. Also, to achieve size reduction, the number of parts for drive transmission may be increased and/or the arrangement of driving mechanism may be restricted.

SUMMARY OF THE INVENTION

Accordingly, an object of the present invention is to provide a lens driving unit and a lens driving device using the lens driving unit which enables both size reduction and a high ratio optical zooming.

As a result of the investigations performed by present inventors, objects described above is achieved by adopting a lens driving unit described below and a lens driving device using the lens driving unit.

Lens driving unit: A lens driving unit according to the present invention in which a lens group holding frame for holding a lens group for an imaging device is made to slide in the optical axis direction of a lens by using a motor, and is characterized in that the lens group holding frame is supported to be able to slide by connecting to a guide pole arranged in parallel with the optical axis; and driving force transmission means consisting of a pinion mounted on the output shaft of the motor and rotates in the direction of rotation of the output shaft of the motor and a rack formed in the lens group holding frame, and transmit a driving force of the motor to the lens group holding frame by gearing the pinion with the rack, and the lens group holding frame is made to slide along the guide pole by the driving force transmission means.

In the lens driving unit according to the present invention, the motor is preferably a flat motor having a small thickness in the output shaft direction.

In the lens driving unit according to the present invention, the pinion is preferably arranged in a substantially central part in a rack moving region in the moving direction of the rack.

In the lens driving unit according to the present invention, it is preferable that the lens group holding frame is locked to the guide pole by a guide member connected to the outer edge of the lens group holding frame and the rack is formed in the outer surface of the guide member.

In the lens driving unit according to the present invention, the rack and the pinion are preferably arranged to gear to make the rack formed in the outer surface of the guide member move in parallel with the optical axis direction.

In the lens driving unit according to the present invention, it is preferable that the output shaft of the motor is provided in the direction perpendicular to the optical axis and the rack formed in the outer surface of the guide member is provided between a guide pole locking part of the guide member to which the guide pole is locked and the output shaft of the motor.

In the lens driving unit according to the present invention, it is preferable that the guide pole locking part of the guide member has a tubular shape in which the guide pole can be inserted and the guide pole is inserted in the tubular guide pole locking part, and the lens group holding frame is supported on the guide pole to be able to slide.

Lens driving device: A lens driving device according to the present invention in which a first lens group and a second lens group for an imaging device are made to slide independently in the optical axis direction of a lens by using the lens driving unit described above, is characterized in that a first guide pole provided in a first lens driving unit to make the first lens group slide and a second guide pole provided in a second lens driving unit to make the second lens group slide are provided in parallel on the outside of a lens group holding frame, a first rack formed in the first lens driving unit and a second rack formed in the second lens driving unit are arranged to be able to slide independently, and a first pinion provided in the first lens driving unit and a second pinion provided in the second lens driving unit are arranged between the first guide pole and the second guide pole arranged in parallel.

In the lens driving device according to the present invention, the first pinion and the second pinion are arranged in a substantially central part in the lengthwise direction of the first guide pole and the second guide pole.

In the lens driving device according to the present invention, the first pinion and the second pinion are arranged in an offset manner in the separation width direction of the first guide pole and the second guide pole.

In the lens driving device according to the present invention, it is preferable that a members of same motors, same pinions, same racks and same guide poles are used to constitute both the first lens driving unit and the second lens driving unit, and the first lens driving unit and the second lens driving unit are arranged adjacently at positions that are axially symmetrical with respect to a reference line V intersecting at right angles with an optical axis L.

In the lens driving unit according to the present invention, since the lens group holding frame is made to slide in the optical axis direction by the driving force transmission means in which the pinion rotating in the direction of rotation of the output shaft of motor gears with the rack formed in the lens group holding frame side, the driving force in the direction of rotation of the motor is converted to linear motion. As the result, the means for transmitting the driving force of motor to the lens group holding frame is made simple to enable the length in the optical axis direction shorter than that of the conventional art in which the motor and the driving shaft are arranged coaxially or in parallel with the sliding direction of the lens group holding frame. In addition, the lens driving device according to the present invention can reduce the size of the whole of the lens driving device, since two lens groups are driven independently by using two lens driving units. Also, as the lens group holding frame can be driven by a simple mechanism even if the motor and the transmission means for the driving force of motor are not arranged in the optical axis direction, as compared with the conventional art, the length in the optical axis direction can be made short, and the sliding distance of the lens group holding frame which increase the range of relative separation distance between the lens groups is secured. Therefore, a lens tube having a small size and a higher zooming ratio in optical zooming can be achieved.

DETAILED DESCRIPTION OF THE PREFERRED EMBODIMENTS

Preferred embodiments of a lens driving unit and a lens driving device according to the present invention will be described with making reference to the drawings attached. It should be noted that the present invention is not limited to the embodiments illustrated.

Figure 1:
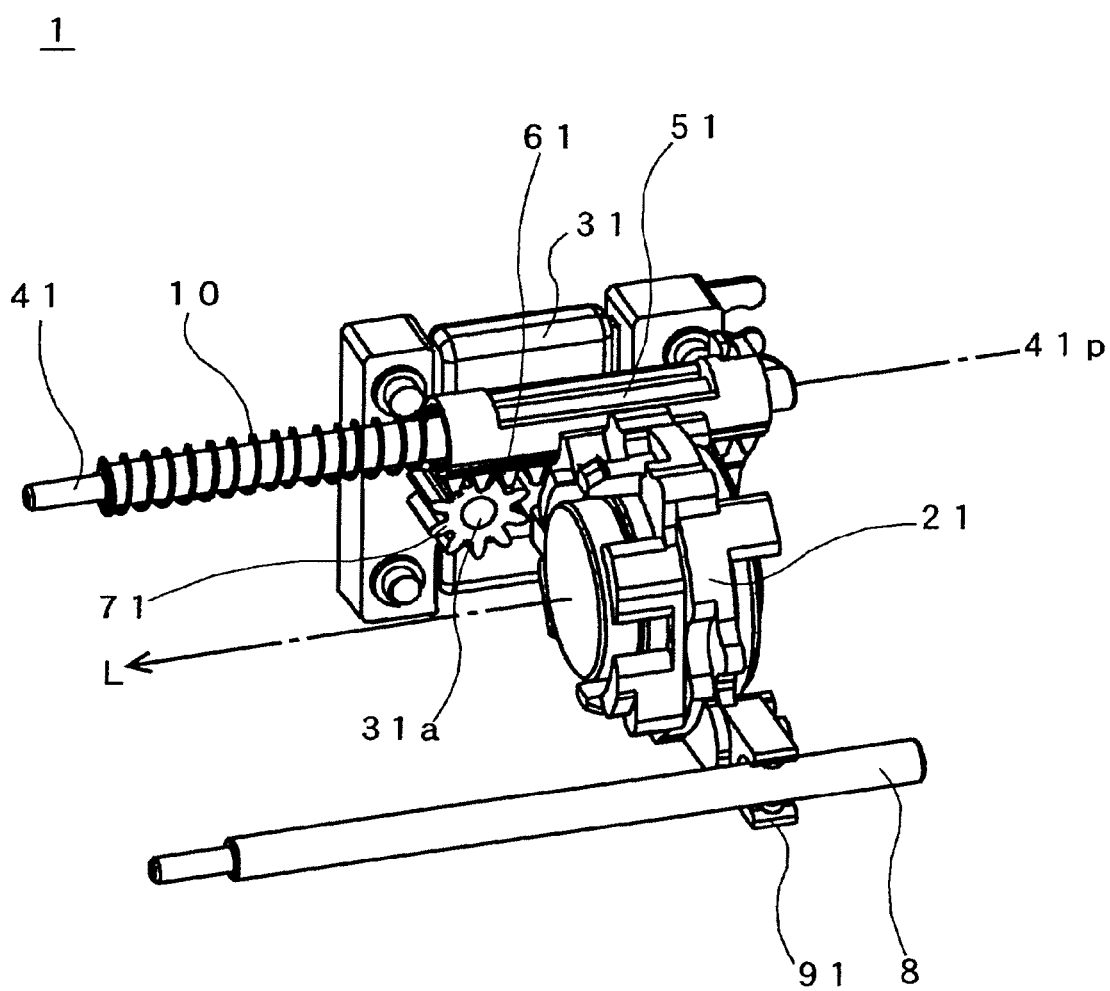
FIG. 1 is a perspective view showing an embodiment of a lens driving unit according to the present invention.
Figure 2:
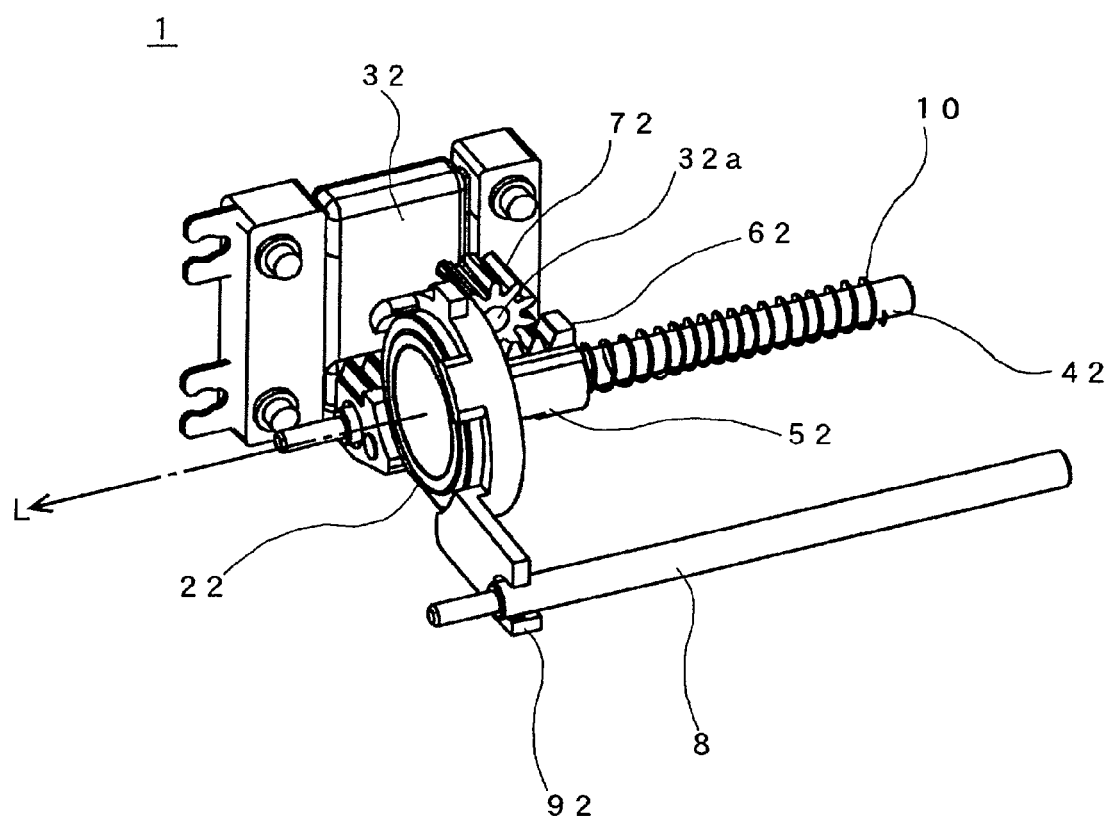
FIG. 2 is a perspective view showing an embodiment of a lens driving unit according to the present invention.

Lens driving unit: FIGS. 1 and 2 are perspective views showing an example of the lens driving unit 1 according to the present invention. As shown in FIGS. 1 and 2, the lens driving unit 1 according to the present invention comprises the lens group holding frames 21 and 22, the motors 31 and 32, the guide poles 41 and 42, the racks 61 and 62, and the pinions 71 and 72. The lens driving unit 1 according to the present invention makes the lens group holding frames 21 and 22 for holding a lens groups for an imaging device slide along an optical axis L of lens by using the motors 31 and 32.

The lens group for an imaging device is constructed by combining a plurality of lenses and is arranged along the optical axis L. For example, they are used for a focusing lens, a zooming lens and the like. The lens group is fixed in the lens group holding frame 2 in such a manner that the lens group fits in the lens group holding frame, and holds the lens group to common the optical axis L of fixed lenses provided in a lens tube. Therefore, sliding motion of the lens group holding frame holding the zooming lens and the focusing lens in the direction of the optical axis L of lens performs the optical zooming function and the focus function.

The guide pole 4, which is a columnar long pole, is arranged in parallel with the optical axis L, and is fixed to a housing (not shown) in which a lens driving mechanism is installed. After the lens group holding frame 2 is locked to the guide pole 4, the lens group holding frame 2 is supported with regulating sliding direction of the lens group holding frame.

Figure 3:
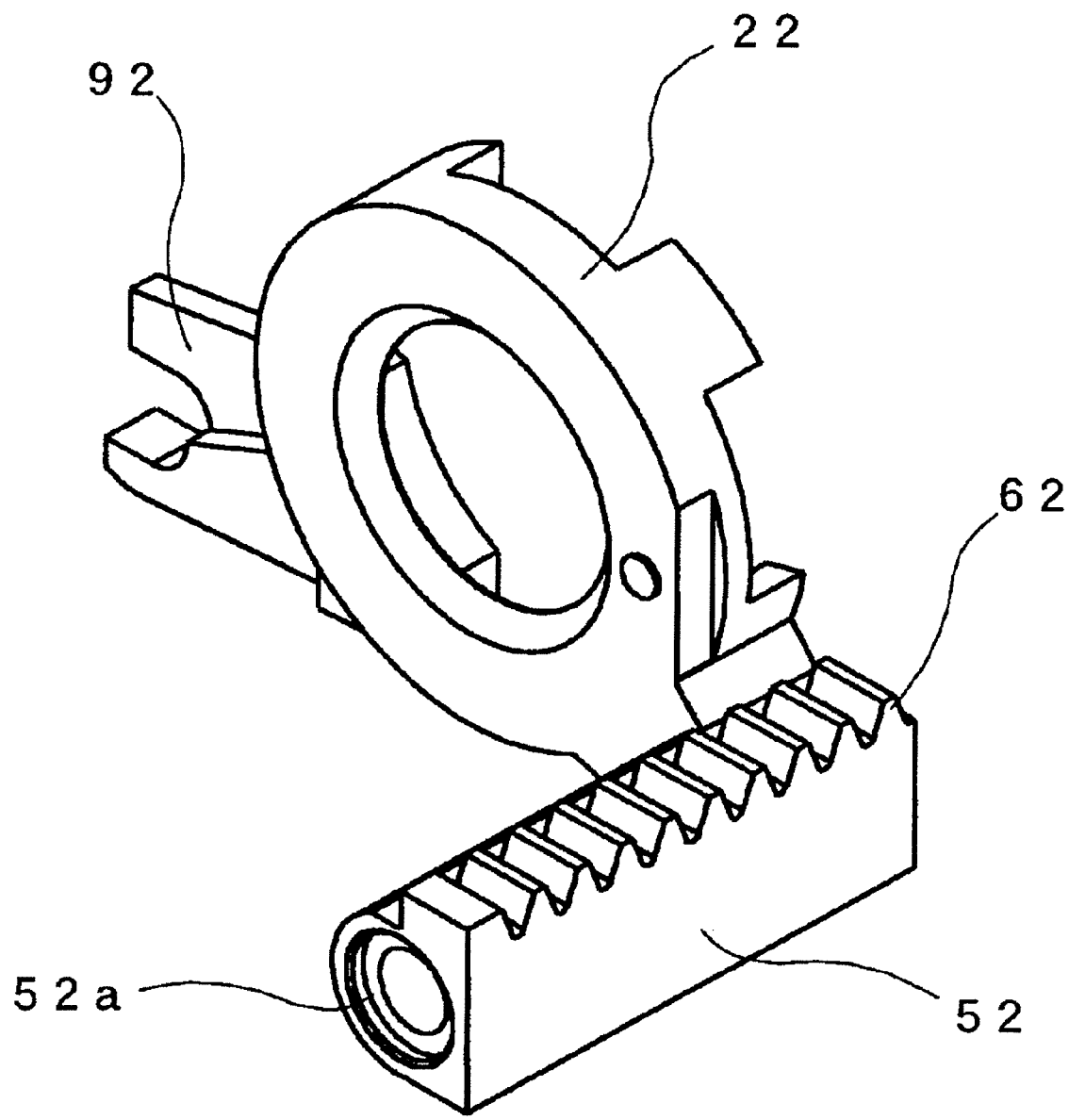
FIG. 3 is a perspective view showing an embodiment of a lens group holding frame provided in the lens driving unit shown in FIG. 2.

Also, the lens group holding frame 2 is preferably supported to be able to slide by an auxiliary guide pole 8 in addition to the guide pole 4. FIG. 3 is a perspective view showing a lens group holding frame used for the lens driving unit 1 shown in FIG. 2. The lens driving unit 1 is constructed to gear the racks 61 and 62 with the pinions 71 and 72 as will be described later. Thus, the lens group holding frames 21 and 22 can slide in the optical axis direction with just the guide poles 41 and 42. However, the auxiliary guide pole 8 is preferably provided to reduce a load on the gearing position of the rack and pinion, and to prevent a minute deviation of the optical axis of lens caused by the sliding motion. In this case, as shown in FIGS. 1 and 2, the auxiliary supports 91 and 92 locked to the auxiliary guide pole 8 is provided at the outer edge of the lens group holding frames 21 and 22.

The motors 31 and 32 are used as the driving means to make the lens group holding frames 21 and 22 slide. A flat motor having a small thickness in the output shaft direction is preferably used as the motors 31 and 32. In the lens driving unit 1 according to the present invention, the output shafts 31a and 32a of the motors 31 and 32 are arranged in the direction perpendicular to the sliding direction (the optical axis L direction) of the lens group holding frames 21 and 22. Therefore, when the flat motor is used, the length in the output shafts 31*a* and 32*a* direction of the motors 31 and 32 can be made short to make the size reduction of the lens driving unit possible, so, it is suitable for reducing the size in the width direction of the lens tube.

Driving force transmission means for transmitting the driving force of the motors 31 and 32 to the lens group holding frames 21 and 22 consists of the racks 61 and 62 and the pinions 71 and 72. The pitch of the racks 61 and 62 formed in an outer edge part of the lens group holding frames 21 and 22 are provided to gear with the pinions 71 and 72. As shown in FIG. 1, at least the peaks of the teeth in the rack 61 should be arranged continuously in the axial direction of an axis line 41*p* of the guide pole 4. Also, the length of the racks 61 and 62 are set according to the sliding range of the lens group holding frames 21 and 22, that is, the zooming ratio of optical zooming. On the other hand, the pinions 71 and 72 are attached onto the output shafts 31*a* and 32*a* of the motors 31 and 32, and rotate in the direction of rotation of the output shafts 31*a* and 32*a* of the motors 31 and 32. By gearing the pinion 71 and 72 with the rack 61 and 62, the driving force transmission means converts the rotation of the pinions 71 and 72 into linear motion, and make the lens group holding frames 21 and 22 slide in the optical axis L direction.

The motors 31 and 32 are arranged at the side of the lens group holding frames 21 and 22 in the state in which the output shafts 31*a* and 32*a* protrude to the lens group holding frames 21 and 22. Also, the motors 31 and 32 are arranged at a position where the pinions 71 and 72 attached onto the output shafts 31*a* and 32*a* gear with the racks 61 and 62. Therefore, the protrusion length of the output shafts 31*a* and 32*a* of the motors 31 and 32 are set according to the gearing position of the racks 61 and 62 and the pinions 71 and 72. The motors 31 and 32 mounted with the pinions 71 and 72 in the output shafts 31*a* and 32*a* may be arranged at a position not hinder the motion of moving members such as the lens group holding frames 21 and 22 at least, and to keep the minimum distance. To reduce the size of the lens driving unit 1, it is preferable to arrange the output shafts 31*a* and 32*a* of the motors 31 and 32 in the direction perpendicular to the optical axis L of lens and protrude toward the lens group holding frames 21 and 22.

It is preferable to arrange the pinions 71 and 72 in a substantially central part of the rack moving region in the rack moving direction to make the sliding distance of the lens group holding frames 21 and 22 (the rack moving distance) long, and then increase the zooming ratio of lens. The moving length of the rack is a sum of the length, the rack itself in the moving direction and the moving distance of rack corresponding to the moving distance of the lens group holding frames 21 and 22.

By the way, the guide member 52 described later may be used for the locking means of the lens group holding frame 22 to the guide pole 42. On the lens group holding frame 22 shown in FIG. 3, the guide member 52 is connected on the outer edge of the lens group holding frame 22 as the locking means to the guide pole 42.

The guide member 52 comprises a guide pole locking part 52*a* for locking the guide pole 42. A shape of the guide pole locking part 52*a* in the portion contact with the guide pole 42 may be at least a circular concave corresponding to the outer peripheral shape of the columnar guide pole 42. For example, it may be a U-shaped guide member having a circular groove corresponding to the circumferential shape of guide pole. When the guide member has a groove having such a shape, bigger angle in some degree for the circular shape increases contact area and it stabilizes the sliding motion. However, it makes diameter of the guide pole and the size of the guide member big. Therefore, in order to slide the lens group holding frame stably with size reduction, it is preferable to perform construction comprising the tubular shaped guide member 52 to which the columnar guide pole 42 is inserted, the guide pole 42 inserted in the tubular guide pole locking part 52*a*, and the lens group holding frame 22 supported to be able to slide on the guide pole 42.

In addition, when the tubular guide pole locking part in which the guide pole 42 is inserted is adopted, the sliding performance may be improved as shown below. The inner wall surface is formed of a resin and greased, or the tubular inner wall surface is formed of a metal to reduce the slide friction at the contact surface between the tubular inner wall surface and the guide pole.

When the rack 62 is formed in the outer surface of the guide member 52, the construction makes the guide member 52 slide along the guide pole 42 by the driving force transmission means, and the driving force of the motor 32 is transmitted to the lens group holding frame 22. As the result, the sliding motion of the lens group holding frame 22 is more stabilized than when the locking means of the lens group holding frame 22 to the guide pole 42 is provided independently from the driving force transmission means. Also, the construction of the driving force transmission means can be made simpler and reduce the space required. The length in the optical axis L direction of the guide member 52 is set according to the sliding range of the lens group holding frame 22. Also, the position where the rack 62 is formed in the guide member 52 may be a position where the rack 62 gears with the pinion 72 on either of the outer surfaces of the guide member 52, and may be determined according to the layout of the pinion 72 and the motor 32.

Then, the arrangement of the driving force transmission means will be described. As shown in FIGS. 1 and 2, the racks 61 and 62 are geared with the pinions 71 and 72 to make the racks 61 and 62 movable in parallel with the optical axis L. Thereby, the driving force of the motor 31 is transmitted by the driving force transmission means to make the lens group holding frame 21 move along the axial direction of the guide pole 41.

Figure 4:
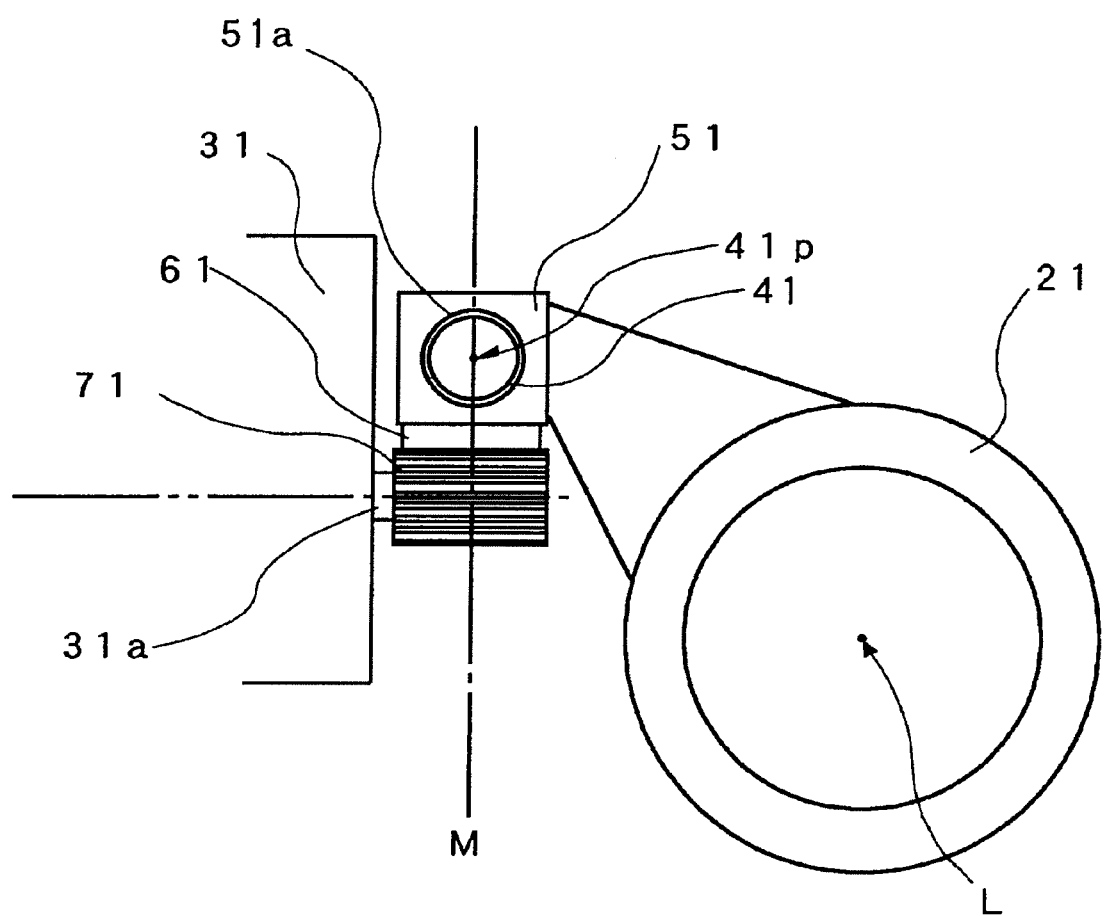
FIG. 4 is a side view showing the arrangement of a rack and pinion in the lens driving unit shown in FIG. 1.
Figure 5:
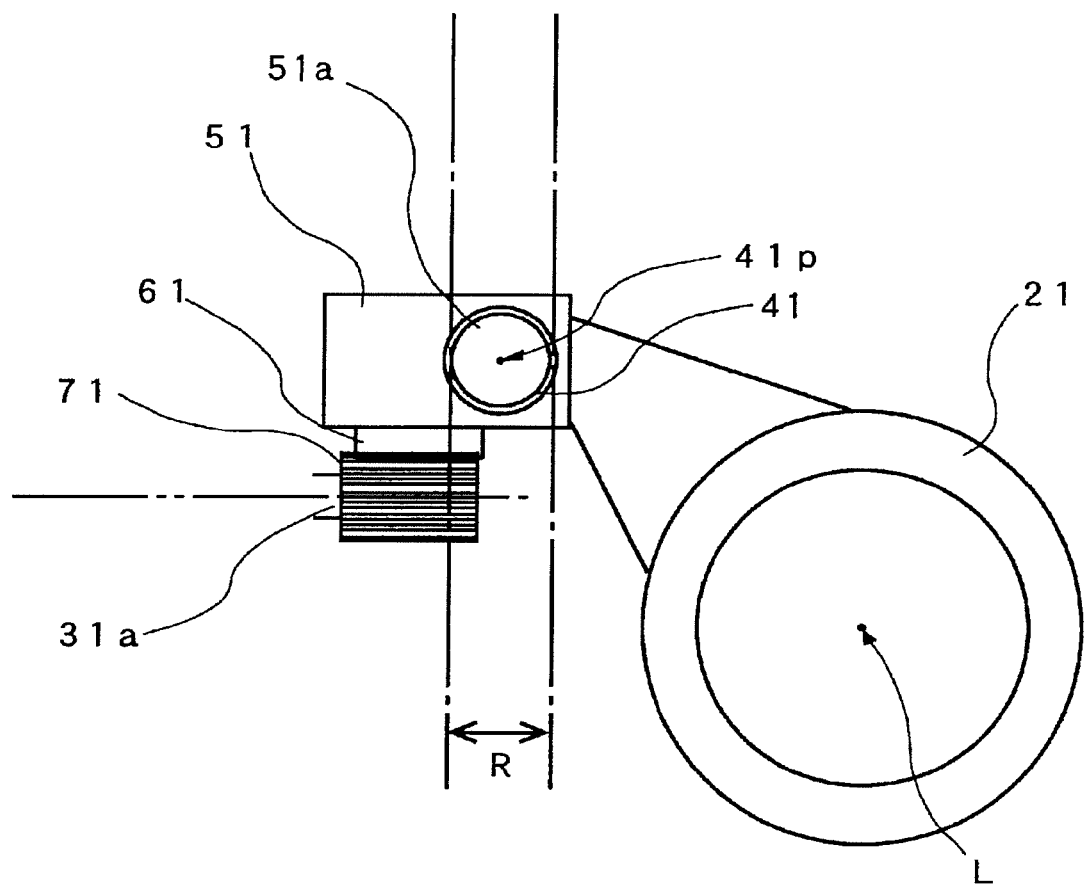
FIG. 5 is a schematic side view showing an arrangement example of a rack and pinion viewed from the optical axis direction of a lens driving unit according to the present invention.

Next, the arrangement of the driving force transmission means viewed from the optical axis direction will be described with making reference to FIGS. 4 and 5. FIG. 4 is a schematic side view of the driving force transmission means for the lens driving unit shown in FIG. 1, being viewed from the lens surface side. FIG. 5 is a schematic side view for explaining a modification of the arrangement of the driving force transmission means. As shown in FIGS. 4 and 5, when the rack 61 is formed in the outer surface of a guide member 51, the driving force transmission means are arranged at a position close to the position where the guide pole 41 slide with the guide pole locking part 51*a*. As the result, the moment generated by the driving force is smaller than when the rack is arranged on another position of the lens group holding frame 21. Therefore, the guide member 51 moves stably along the guide pole 41 to make the sliding motion of the lens group holding frame 21 more stabilized.

In the arrangement of the driving force transmission means viewed from the optical axis direction, the rack 61 should be formed to be able to slide in the optical axis direction on either of the outer surfaces of the guide member 51. For example, the rack 61 may be formed at a position extending from the guide member 51. It is preferable as shown in FIG. 5 in which the guide pole 41 is locked to the guide pole locking part 51*a*, at least a part of the gear surface between the rack 61 and the pinion 71 viewed from the optical axis direction is arranged at a position close to the extension line of the sliding part of the guide pole locking part 51*a* and the guide pole 41 (within a region R shown in FIG. 5). As the result, sliding motion of the lens group holding frame 21 is made stable, and the arrangement space of the lens group holding frame 21 and the driving force transmission means thereof is reduced.

The most favorable mode is shown in FIG. 4. When being viewed from the optical axis direction, the driving force transmission means are arranged at a position where an imaginary line M intersecting at right angles with the gear surface between the rack 61 and the pinion 71 passes through the section center 41*p* of the guide pole 41. As the result, the moment generated by the driving force is made minimum to make sliding motion of the guide pole 41 in the guide pole locking part 51*a* stable. In addition, the width of the lens driving unit viewed from the optical axis can be made small.

As shown in FIGS. 1 and 2, when the springs 10 are put around the guide poles 41 and 42, and the springs 10 are brought into contact with the guide members 51 and 52, the springs 10 regulate the sliding motion of the guide members 51 and 52 in addition to the drive control of the motor 31 and 32. It means that, backlash and hysteresis can be reduced by making the lens group holding frames 21 and 22 tend to locate to one side in the sliding direction by means of the spring 10.

Next, the sliding motion mechanism of the lens driving unit 1 will be described. First, as the racks 61 and 62 gearing with the pinions 71 and 72 are the driving force transmission means, when the pinions 71 and 72 rotate according to the rotation of the output shafts 31*a* and 32*a* of the motors 31 and 32, the rotating motion of the motors 31 and 32 are converted into linear motion, and the driving force is transmitted to the guide members 51 and 52 comprising the racks 61 and 62 to make the guide members 51 and 52 slide along the guide poles 41 and 42. Since the guide members 51 and 52 are connected to the lens group holding frames 21 and 22, the lens group holding frames 21 and 22 slide with the moving of the guide members 51 and 52.

Conventionally, the driving force transmission means such as a lead screw has been arranged separately from the locking means (for example, the guide member) to the guide pole. However, since the driving force transmission means in the lens driving unit 1 according to the present invention is composed of the racks 61 and 62 provided on the outer surface of the guide members 51 and 52 and the pinions 71 and 72 mounted to the motors 31 and 32, space in the optical axis L direction can be reduced despite simple construction when compared with the conventional example using a lead screw. In the lens driving unit 1 according to the present invention, the motors 31 and 32 and the driving force transmission means are not arranged in parallel and coaxially with the optical axis L. Therefore, in the sliding region of the guide members 51 and 52, the region is not occupied by the motor and the driving force transmission means. As the result, the sliding region of the lens group holding frame can be made long, and the size in the optical axis direction can be reduced also.

Also, the construction comprising a member (a guide shaft, etc.) for regulating the rotation of the lens group holding frame itself is required in the conventional lens driving mechanism when the lead screw and the nut on the lens group holding frame side are geared with each other, and the rotation of lead screw caused by the driving force of motor is transmitted to the nut gearing with the lead screw to slide the lens group holding frame, since the lens group holding frame has rotated in the direction of nut rotation. However, in the lens driving unit 1 according to the present invention, since the racks 61 and 62 and the pinions 71 and 72 are used as the driving force transmission means of the motors 31 and 32, a force for rotation is not transmitted to the lens group holding frame 21 and 22 directly. Therefore, it is easy for the lens group holding frames 21 and 22 to keep a predetermined position, and deviation caused by motion can be reduced.

Figure 6:
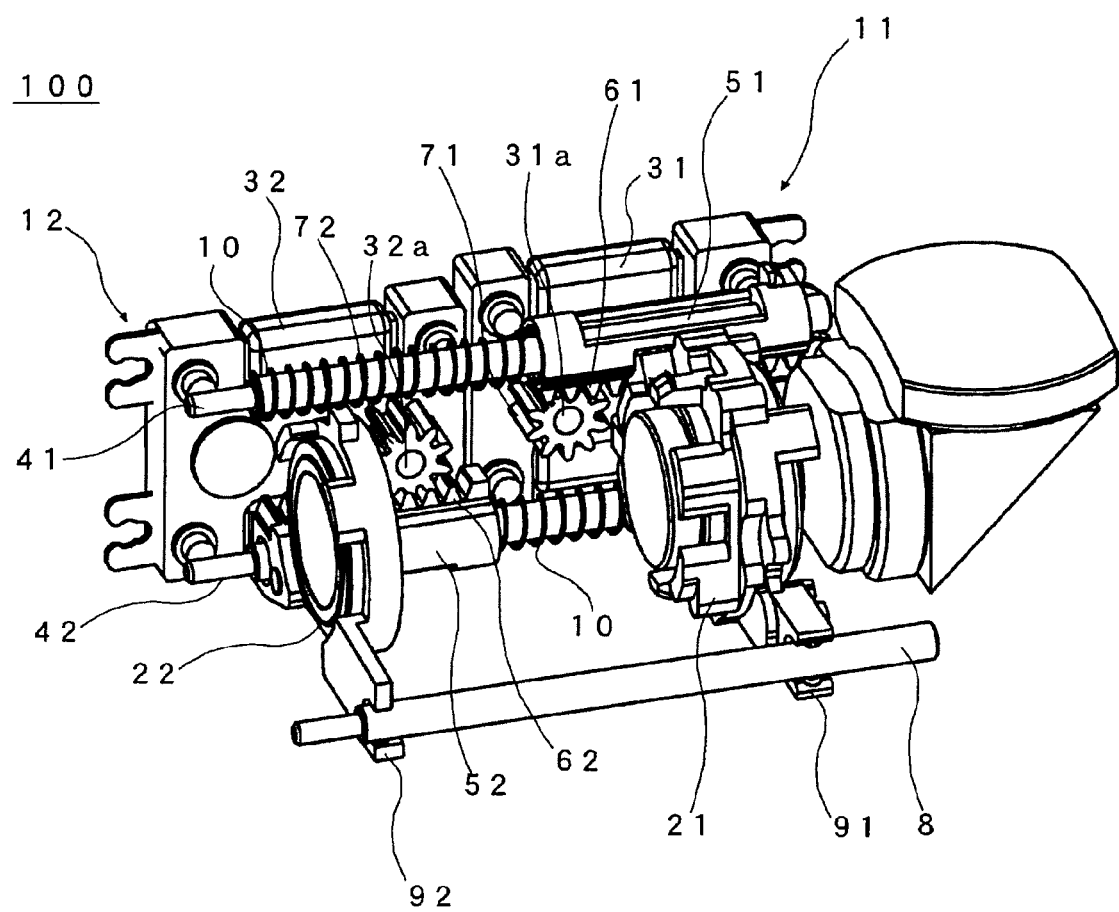
FIG. 6 is a perspective view showing an embodiment of a lens driving device according to the present invention.
Figure 7:
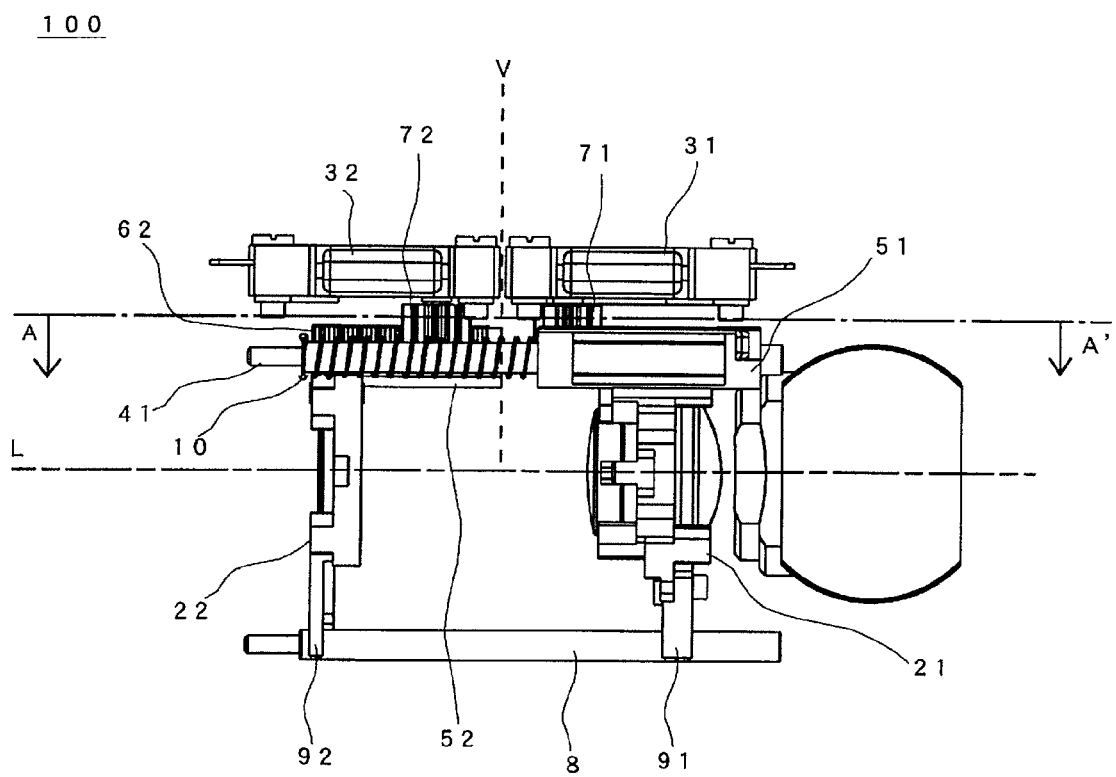
FIG. 7 is a bird view showing an embodiment of a lens driving device according to the present invention.
Figure 8:
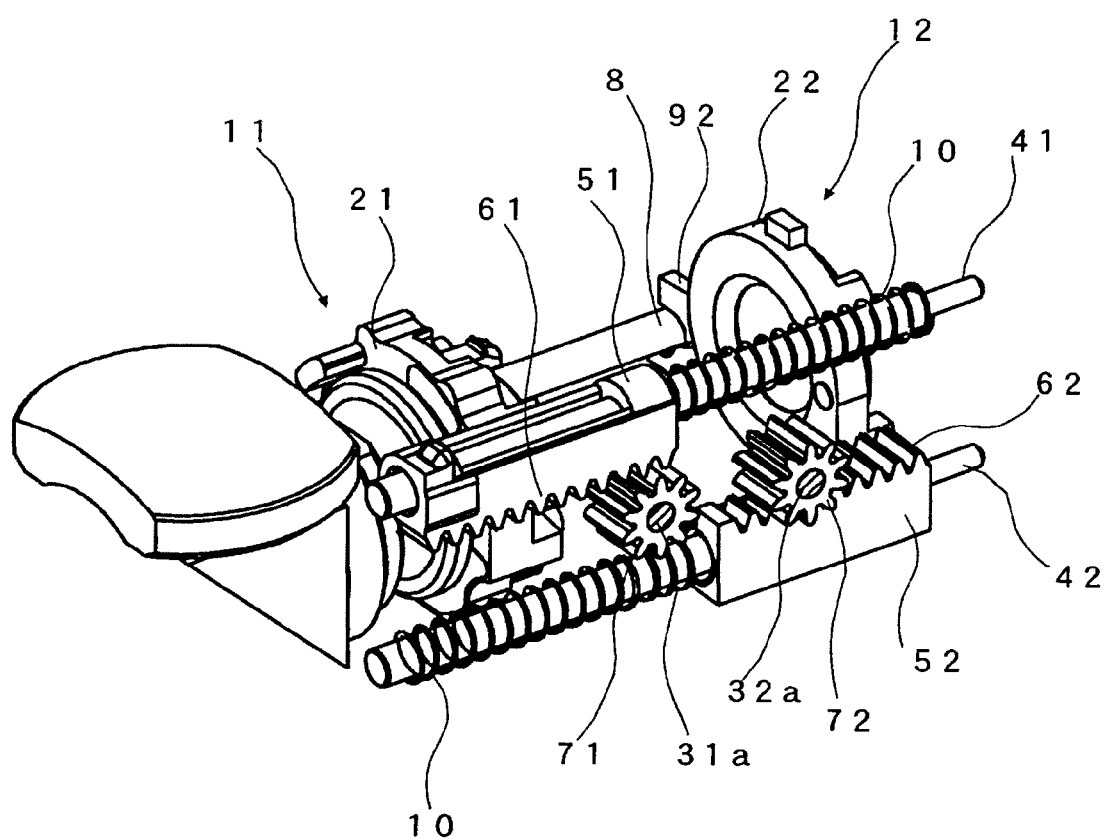
FIG. 8 is a perspective view of a cross section taken along the line A-A' of the lens driving device shown in FIG. 7.
Figure 9:
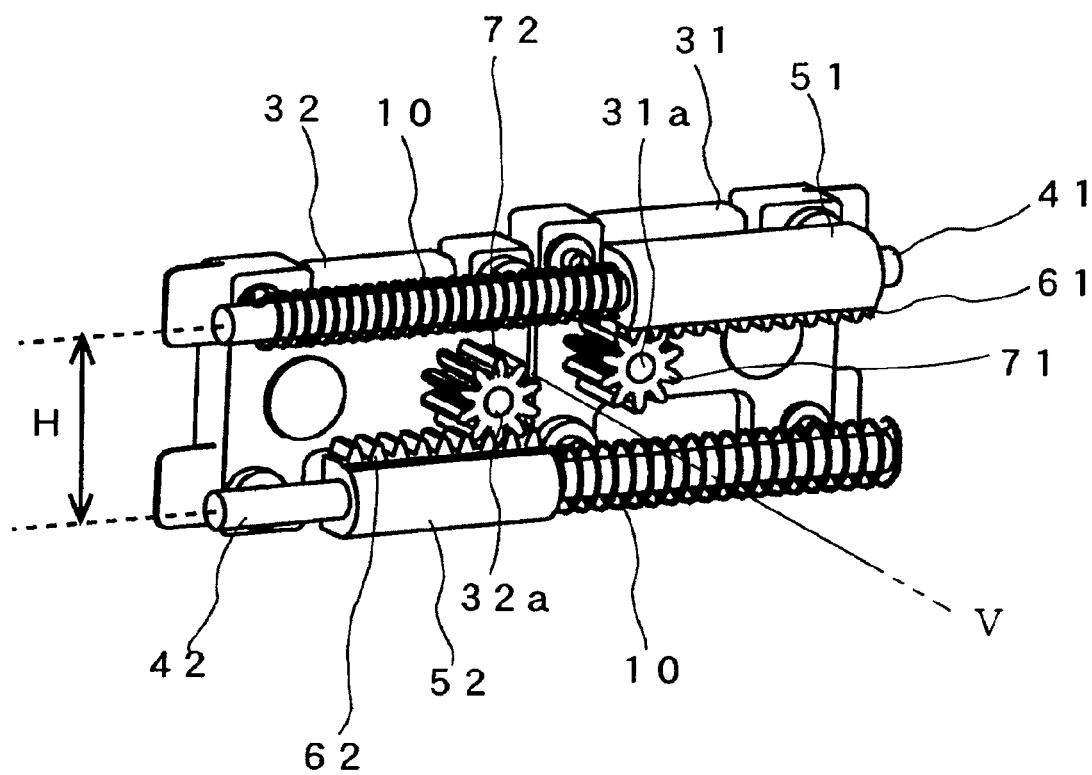
FIG. 9 is a perspective partial view showing the arrangement of a first lens driving unit and a second lens driving unit of the lens driving device shown in FIG. 7.

Lens driving device: A lens driving device 100 according to the present invention will be described with making reference to the drawings. FIG. 6 is a perspective view showing an embodiment of the lens driving device 100 according to the present invention. FIG. 7 is a bird view of the lens driving device 100 shown in FIG. 6. FIG. 8 is a perspective view of a cross section taken along the line A-A' of the lens driving device 100 shown in FIG. 7. FIG. 9 is a perspective partial view showing the arrangement of a first lens driving unit 11 and a second lens driving unit 12 of the lens driving device 100 shown in FIG. 7.

The lens driving device 100 according to the present invention is a lens driving device that a first lens group and a second lens group for an imaging device are made slide independently by using the above-described lens driving units. It means that, the first lens group is made to slide by the first lens driving unit 11, and the second lens group is made to slide by the second lens driving unit 12.

As shown in FIG. 6, in the lens driving device 100 according to the present invention, the first lens driving unit 11 shown in FIG. 1 is provided on the object side, and the second lens driving unit 12 shown in FIG. 2 is provided on the image focusing side. As shown in FIGS. 6 and 8, a first guide pole 41 provided in the first lens driving unit 11 and a second guide pole 42 provided in the second lens driving unit 12 are arranged in parallel on the outside of the lens group holding frames 21 and 22. Conforming to the first guide pole 41 and the second guide pole 42, a first guide member 51 provided in the first lens driving unit 11 and a second guide member 52 provided in the second lens driving unit 12 are arranged at positions to be parallel with each other. Also, a first rack 61 formed in the first lens driving unit 11 and a second rack 62 formed in the second lens driving unit 12 are provided on the first guide member 51 and the second guide member 52, respectively, so as to be able to slide. The lengths of the first guide member 51 and the second guide member 52 may be equal to or longer than the lengths of the first rack 61 and the second rack 62, respectively.

As shown in FIG. 8, the first pinion 71 provided in the first lens driving unit 11 and the second pinion 72 provided in the second lens driving unit 12 are arranged between the first guide pole 41 and the second guide pole 42 arranged in parallel.

The first pinion 71 and the second pinion 72 are arranged in substantially central parts in the lengthwise direction of the first guide pole 41 and the second guide pole 42, respectively. In this embodiment, the racks 61 and 62 are formed in the guide members 51 and 52. Therefore, arrangement of the first pinion 71 and the second pinion 72 in the substantially central parts in the lengthwise direction of the guide poles 41 and 42, respectively, makes the moving distance in the optical axis L direction of the lens group holding frame 2 long. Since the first pinion 71 and the second pinion 72 are arranged at positions close to the substantially central parts in the lengthwise direction of the guide poles 41 and 42, respectively, the sliding distance of the lens group holding frame 2 is made long. As the result, distance between the first lens group and the second lens group can be made longer, and it enables a lens driving device to be a high zooming ratio and a small size.

Furthermore, the first pinion 71 and the second pinion 72 are arranged in an offset manner in the direction between the first guide pole 41 and the second guide pole 42 (the line H direction shown in FIG. 9). As the result, the first pinion 71 is provided at a position where it gears with the first rack 61 but does not gear with nor touch the second rack 62. Also, the second pinion 72 is provided at a position where it gears with the second rack 62 but does not gear with nor touch the first rack 61. Therefore, the distance between the first guide pole 41 and the second guide pole 42 is at least longer than the diameter of the pinion 71 and 72. Thus, the first lens driving unit 11 and the second lens driving unit 12 can drive respective lens group holding frames independently without interference with each other. Example described in the embodiment shows the same length for the first rack 61 and the second rack 62, but the present invention is not limited to the example, and either one of the first rack 61 and the second rack 62 may be made longer than the other according to the preferable moving distance of the lens group.

As shown in FIG. 6, the auxiliary guide pole 8 is a common member to which the auxiliary support 91 of the first lens driving unit 11 and the auxiliary support 92 of the second lens driving unit 12 are locked. Because the auxiliary guide pole 8 is a common member, the accuracy of alignment in the optical axes L direction between the first lens group and the second lens group can be improved.

In the lens driving device 100 according to the present invention, the first guide member 51 and the second guide member 52 locked to the first guide pole 41 and the second guide pole 42 arranged in parallel with each other, respectively, are provided at positions where they are able to slide. Because the pinions 71 and 72 are arranged between the first guide member 51 and the second guide member 52, and the first rack 61 and the second rack 62 are formed to gear with the pinions 71 and 72, a first motor 31 and a second motor 32 can be arranged side by side in a region on one side of the outer peripheries of the lens group holding frames 21 and 22, respectively (refer to FIGS. 6 and 7). As the result, the driving mechanisms of the lens group holding frames can be gathered together in the region on one side of the outer peripheries of the lens groups.

Next, the arrangement of the first lens driving unit 11 and the second lens driving unit 12 in the lens driving device 100 according to the present invention will be described. In the lens driving device 100 according to the present invention, the first lens driving unit 11 and the second lens driving unit 12 are composed of the same motors 31 and 32, the same racks 61 and 62, the same pinions 71 and 72, and the same guide poles 41 and 42, in the same arrangement, respectively. The first lens driving unit 11 and the second lens driving unit 12 are arranged adjacently at positions that are axially symmetrical with respect to a reference line V (refer to FIGS. 7 and 9) intersecting at right angles with the optical axis L.

As shown in FIGS. 6, 8 and 9, in the lens driving unit, the pinions 71 and 72 are arranged at positions offset from a middle point between the first guide pole 41 and second guide pole 42 separately arranged. For example, in FIGS. 6, 8 and 9, the pinions 71 and 72 are arranged at positions offset from the center position of the housing of motor. When the first lens driving unit 11 and the second lens driving unit 12 are arranged at positions axially symmetrical with respect to the reference line V, the constituent members of the first lens driving unit 11 and the second lens driving unit 12, which are driven independently, do not interfere with each other and layout with reduced useless space in the lens driving device 100 can be achieved. Also, since the sliding distance of the lens group holding frames 21 and 22 is made long to enable the positioning highly flexible, and then a higher zooming ratio in small size can be achieved in the lens driving device 100.

Since the lens driving unit according to the present invention utilizes a rack and pinion as the driving force transmission means of the motor, the construction of the driving force transmission means are simpler than that of the conventional one, and the size of the lens driving unit is reduced, and the restriction in arrangement of the parts is made small. Therefore, a size reduction can be achieved while the movable region of the lens group holding frame in the optical axis direction is secured. As the result, lens driving unit according to the present invention can be used as a unit constituting lens for an imaging device such as a small camera with a higher zooming ratio.

What is claimed is:

1. A lens driving device to make a first lens group and a second lens group for an imaging device slide independently in the optical axis direction of a lens by using a lens driving unit which makes a lens group holding frame for holding a lens group slide in the optical axis direction of a lens by using a motor,
   wherein the lens driving unit is such that the lens group holding frame is supported to be able to slide by connecting to a guide pole arranged in parallel with the optical axis; and
   a driving force transmission means consisting of a pinion which is mounted on the output shaft of the motor and rotates in the direction of rotation of the output shaft of the motor and a rack formed in the lens group holding frame is provided to transmit a driving force of the motor to the lens group holding frame by gearing the pinion with the rack and the lens group holding frame is made to slide along the guide pole by the driving force transmission means,
   wherein a first guide pole provided in a first lens driving unit to make the first lens group slide and a second guide pole provided in a second lens driving unit to make the second lens group slide are provided in parallel on the outside of the lens group holding frame;
   a first rack formed in the first lens driving unit and a second rack formed in the second lens driving unit are arranged to be able to slide independently; and
   a first pinion provided in the first lens driving unit and a second pinion provided in the second lens driving unit are arranged between the first guide pole and the second guide pole arranged in parallel.

2. The lens driving device according to claim 1, wherein the motor is a flat motor having a small thickness in the output shaft direction.

3. The lens driving device according to claim 1, wherein the pinion is arranged in a substantially central part in a rack moving region in the moving direction of the rack.

4. The lens driving device according to claim 1, wherein
   the lens group holding frame is locked to the guide pole by a guide member connected to the outer edge of the lens group holding frame; and
   the rack is formed in the outer surface of the guide member.

5. The lens driving device according to claim 4, wherein the rack and the pinion are arranged to gear to make the rack formed in the outer surface of the guide member move in parallel with the optical axis direction.

6. The lens driving device according to claim 4, wherein the output shaft of the motor is provided in the direction perpendicular to the optical axis; and the rack formed in the outer surface of the guide member is provided between a guide pole locking part of the guide member to which the guide pole is locked and the output shaft of the motor.

7. The lens driving device according to claim 4, wherein a guide pole locking part of the guide member has a tubular shape in which the guide pole can be inserted; and the guide pole is inserted in the tubular guide pole locking part, and the lens group holding frame is supported on the guide pole to be able to slide.

8. The lens driving device according to claim 1, wherein the first pinion and the second pinion are arranged in a substantially central part in the lengthwise direction of the first guide pole and the second guide pole.

9. The lens driving device according to claim 8, wherein the first pinion and the second pinion are arranged in an offset manner in the separation width direction of the first guide pole and the second guide pole.

10. The lens driving device according to claim 1, wherein members of same motors, same pinions, same racks and same guide poles are used to constitute both the first lens driving unit and the second lens driving unit; and the first lens driving unit and the second lens driving unit are arranged adjacently at positions that are axially symmetrical with respect to a reference line V intersecting at right angles with an optical axis L.

11. The lens driving device according to claim 1, wherein the first pinion and the second pinion are arranged on the same periphery plane of the lens groups where both of at least a part of the first geared surface between the first rack and the first pinion and a part of the second geared surface between the second rack and the second pinion are made to locate between the first guide pole and the second guide pole when viewed from the optical axis direction.

* * * * *